March 29, 1966 R. E. DILLER ETAL 3,242,548
MACHINE FOR PRODUCING AND HANDLING ELONGATED TUBULAR ITEMS
Filed Sept. 10, 1962 11 Sheets-Sheet 3
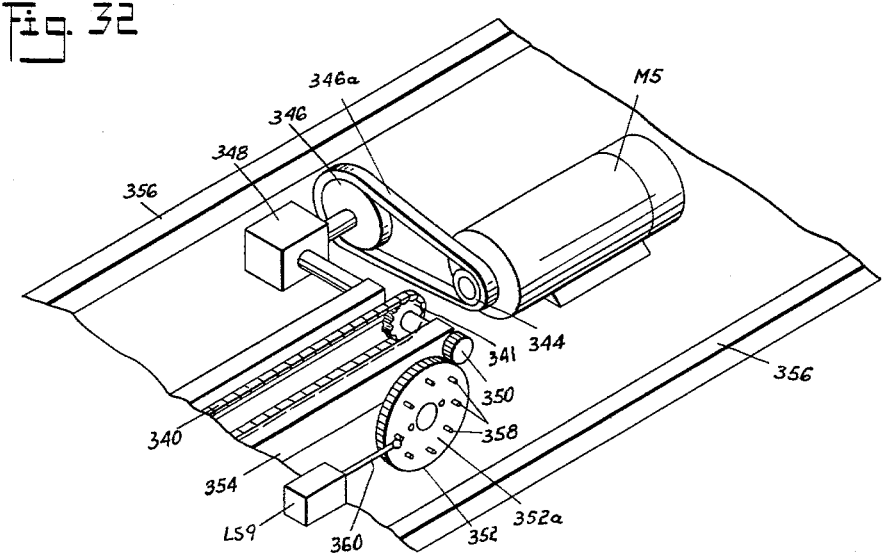
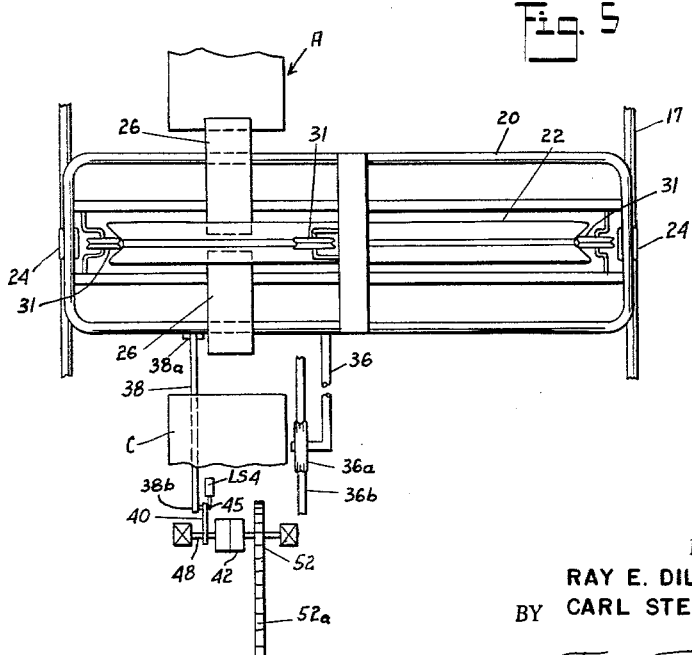
INVENTORS
RAY E. DILLER
BY CARL STEINER
Teare, Teher & Teare
ATTORNEYS March 29, 1966  R. E. DILLER ETAL  3,242,548
MACHINE FOR PRODUCING AND HANDLING ELONGATED TUBULAR ITEMS
Filed Sept. 10, 1962  11 Sheets-Sheet 4

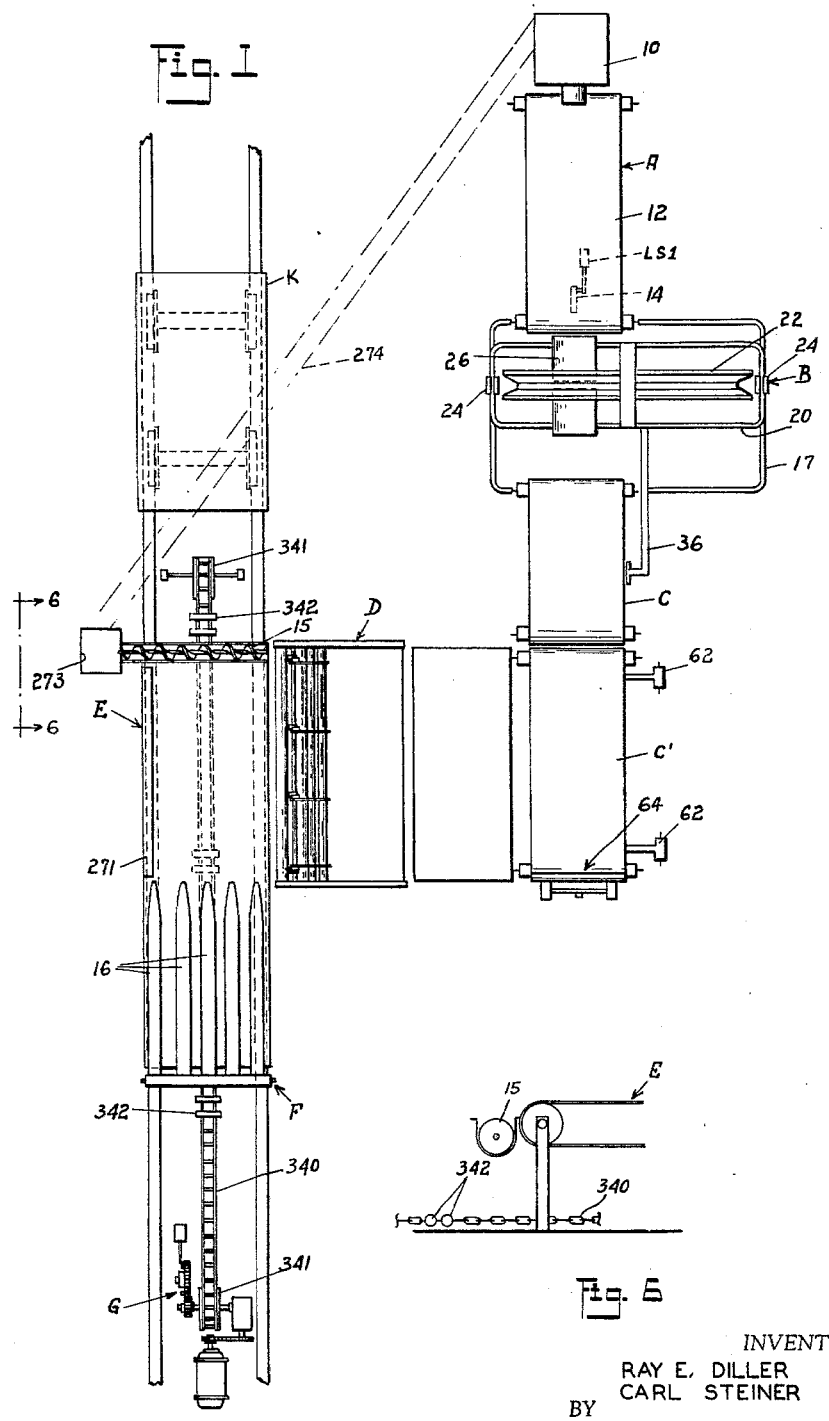

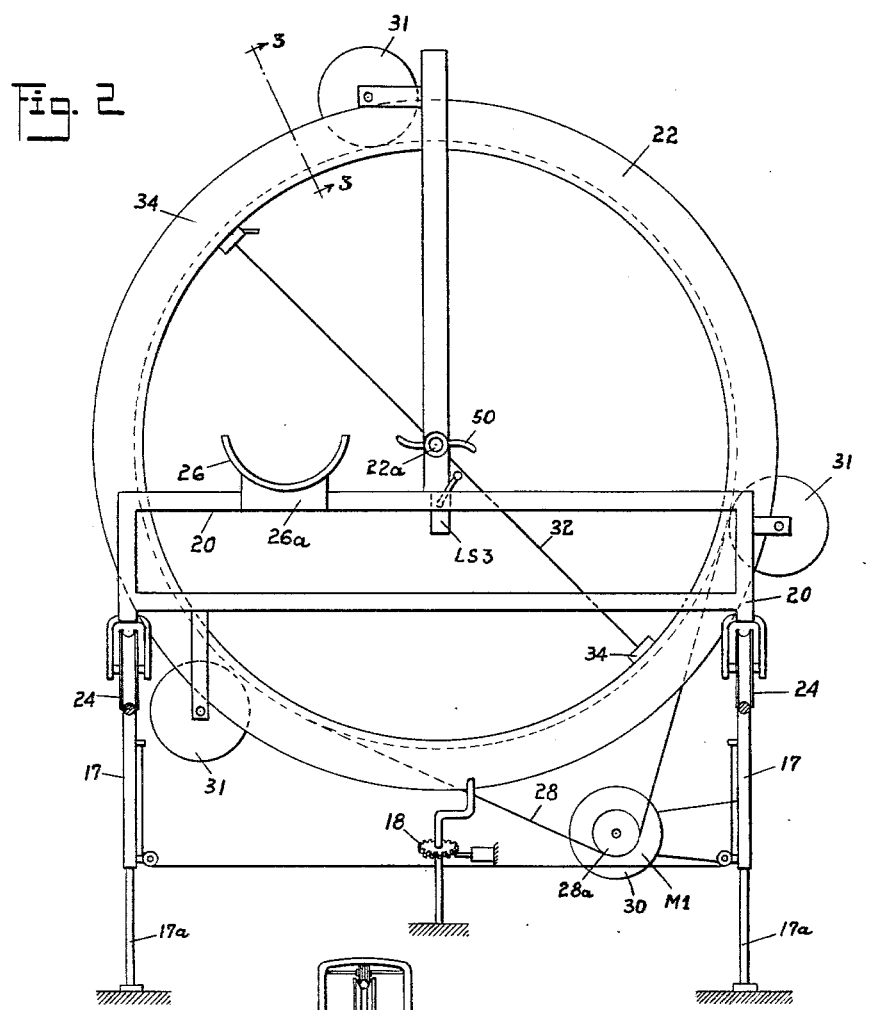
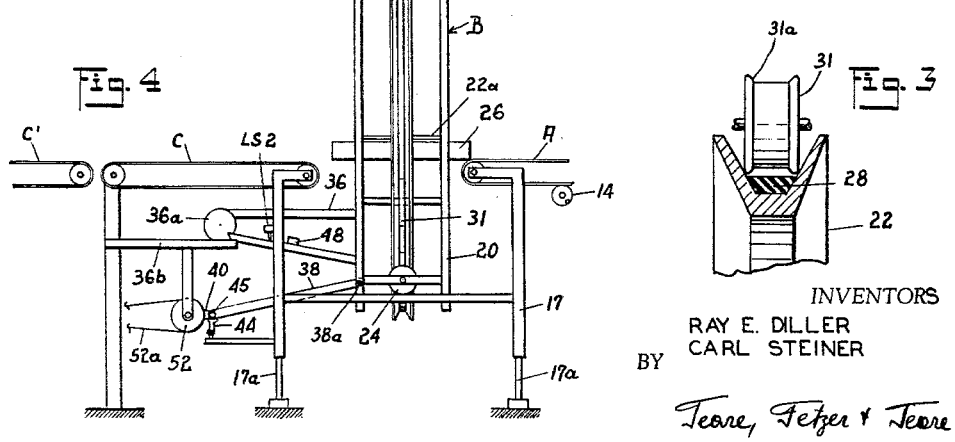
INVENTORS
RAY E. DILLER
CARL STEINER
ATTORNEYS

INVENTORS
RAY E. DILLER
CARL STEINER
BY
Teare, Fetzer & Teare
ATTORNEYS

March 29, 1966  R. E. DILLER ETAL  3,242,548
MACHINE FOR PRODUCING AND HANDLING ELONGATED TUBULAR ITEMS
Filed Sept. 10, 1962  11 Sheets-Sheet 5

INVENTORS
RAY E. DILLER
CARL STEINER
BY
*Teare, Teter & Teare*
ATTORNEYS

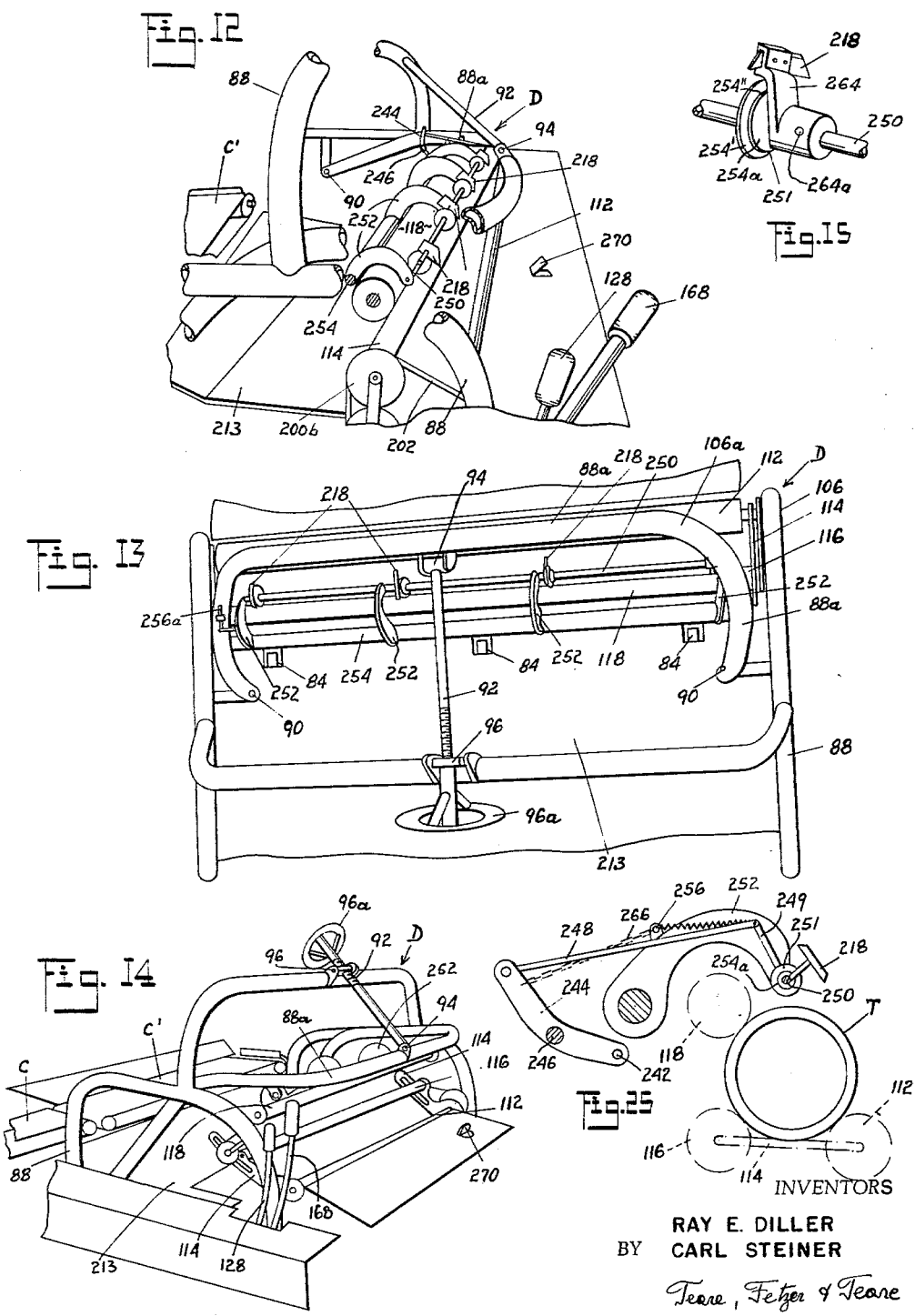

March 29, 1966 R. E. DILLER ETAL 3,242,548
MACHINE FOR PRODUCING AND HANDLING ELONGATED TUBULAR ITEMS
Filed Sept. 10, 1962 11 Sheets-Sheet 7
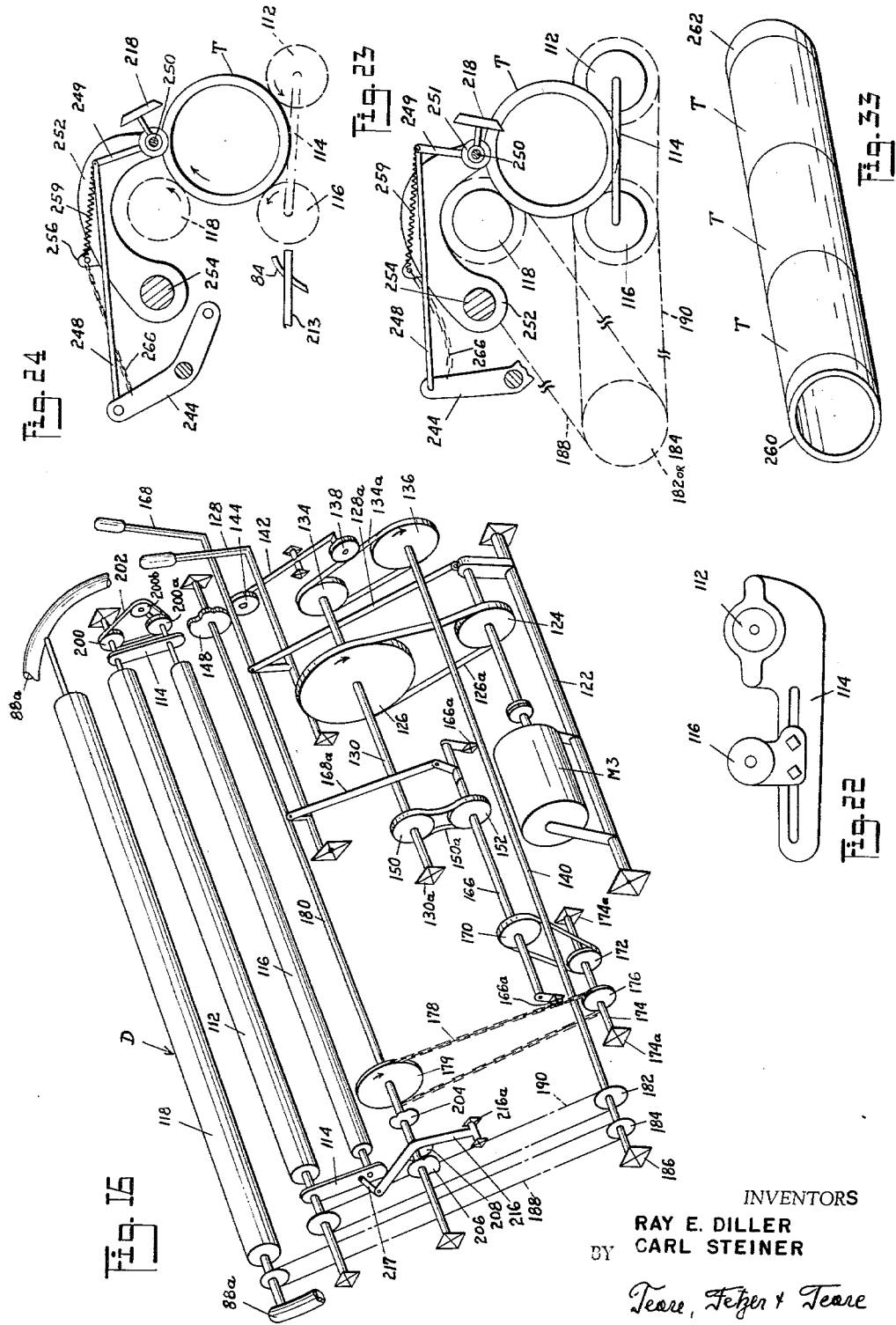
INVENTORS
RAY E. DILLER
CARL STEINER
BY
Teare, Teher & Teare
ATTORNEYS

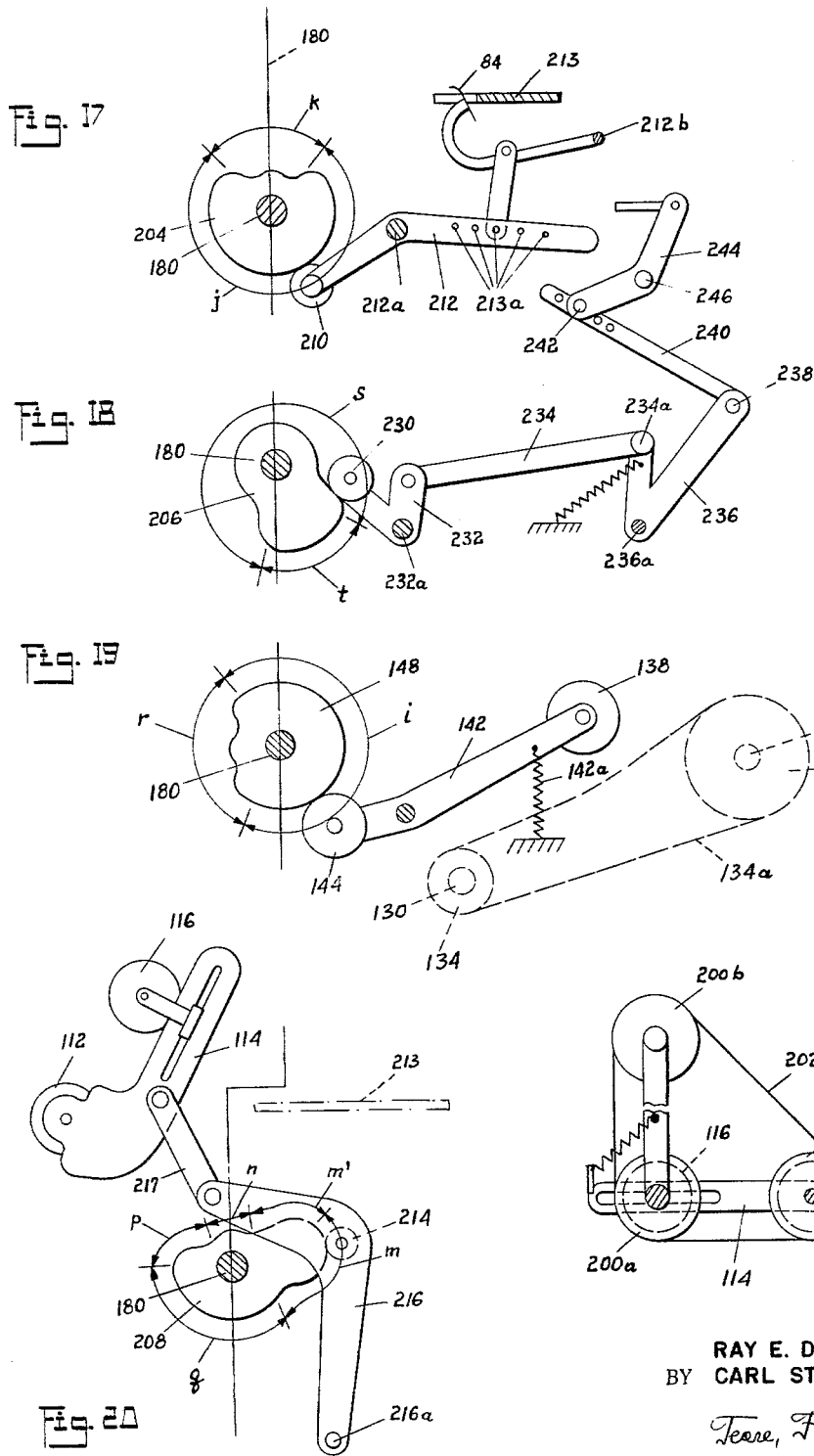

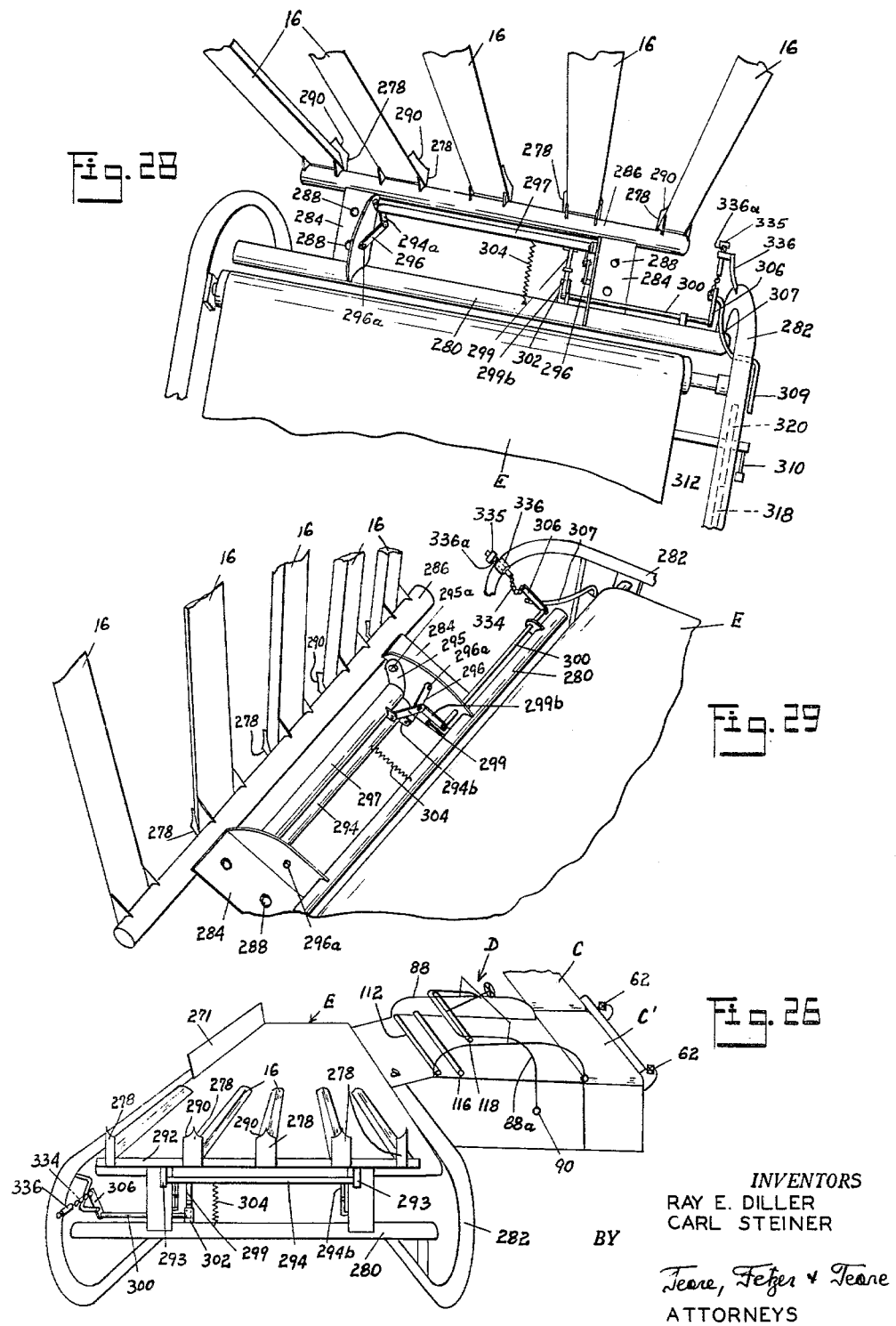

March 29, 1966 R. E. DILLER ETAL 3,242,548
MACHINE FOR PRODUCING AND HANDLING ELONGATED TUBULAR ITEMS
Filed Sept. 10, 1962 11 Sheets-Sheet 10
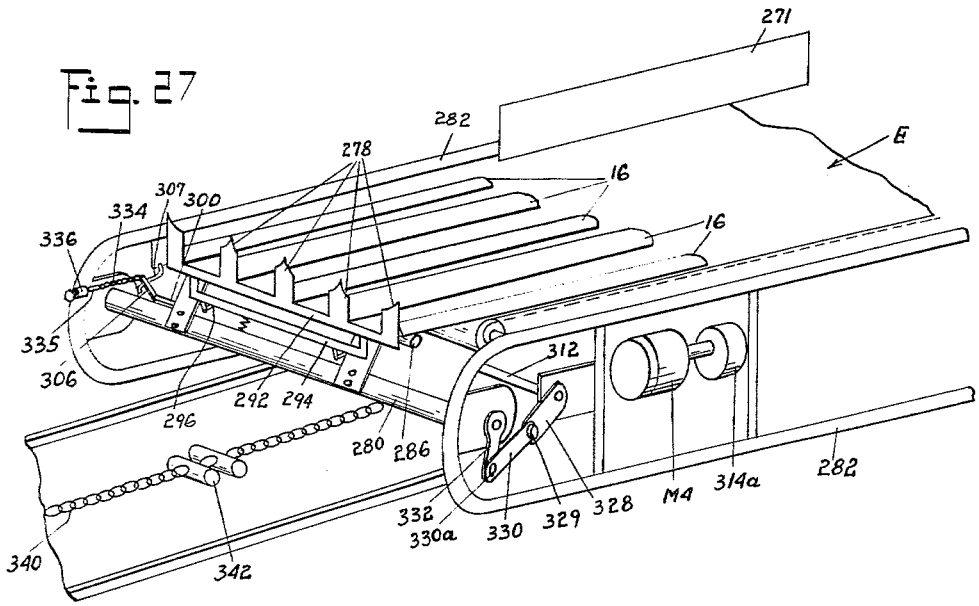
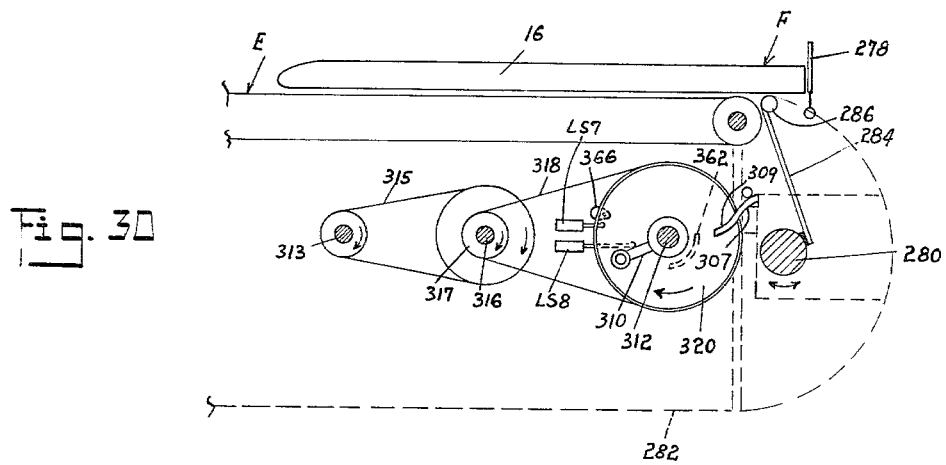
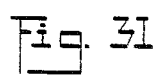
INVENTORS
RAY E. DILLER
CARL STEINER
BY
Teare, Fetzer & Teare
ATTORNEYS

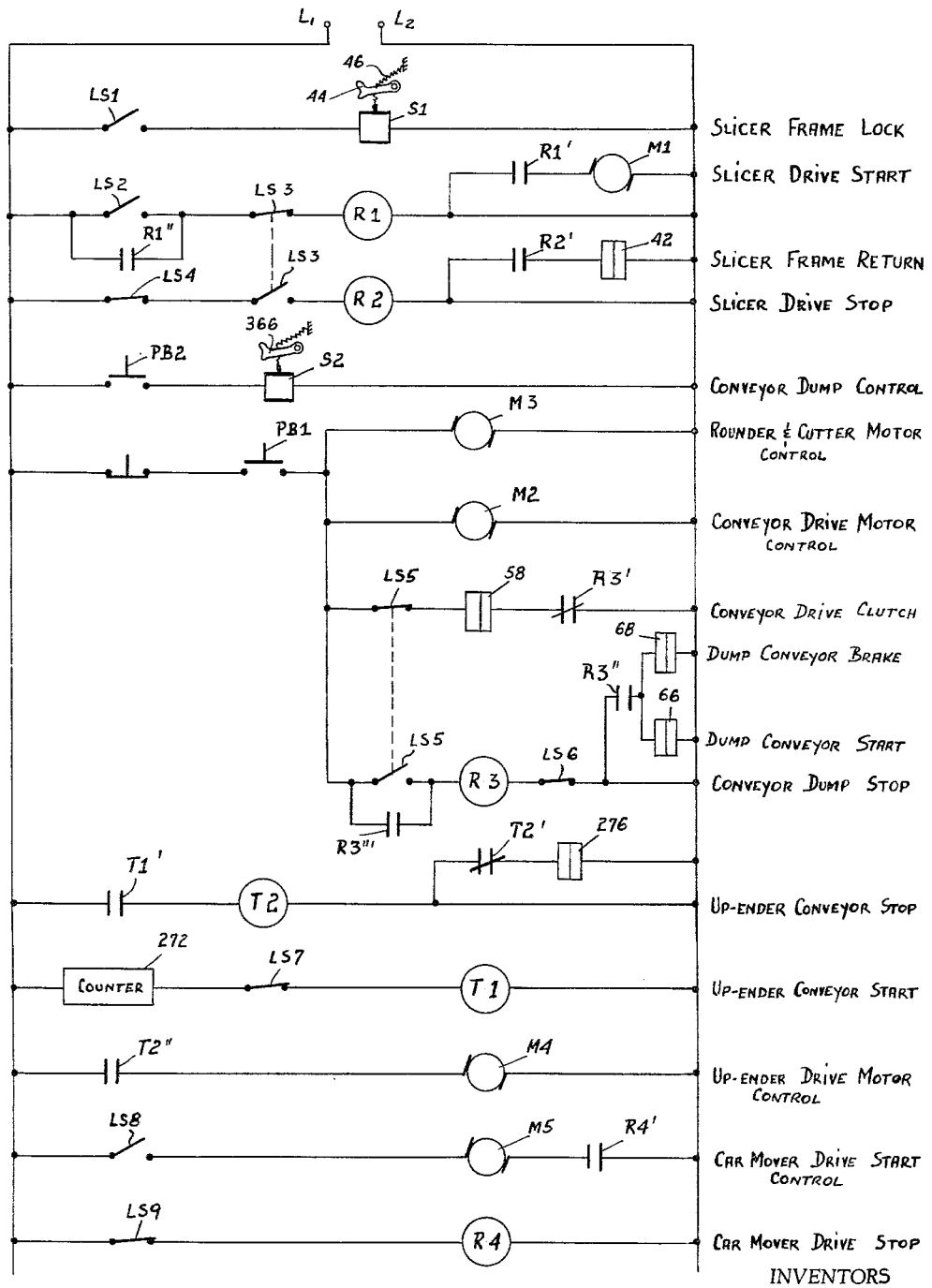

United States Patent Office 3,242,548
Patented Mar. 29, 1966

3,242,548
MACHINE FOR PRODUCING AND HANDLING
ELONGATED TUBULAR ITEMS
Ray E. Diller and Carl Steiner, Orrville, Ohio, assignors
to Orrville Tile Company, Orrville, Ohio, a corporation
of Ohio
Filed Sept. 10, 1962, Ser. No. 222,722
11 Claims. (Cl. 25—30)

This invention relates in general to the production and handling of elongated tubular-like objects, and more particularly to the production and handling of tile, particularly clay tile for draining purposes and the like.

Heretofore, the production of drain tile has generally been a time consuming and somewhat expensive procedure, usually involving considerable manual operations between the time that the wet or green tile was first being formed, to the time that the tile was ready for drying or firing in a kiln or the like.

The present invention provides a novel mechanism and method for producing tile, such as drain tile, and for handling and preparing such tile for entry into a drying or firing device.

Accordingly, an object of the invention is to provide a novel mechanism for the production of elongated tubular tile.

Another object of the invention is to provide a novel machine for providing predetermined lengths of tubular, plastic material, such as wet clay, severing such lengths into shorter predetermined length sections, and then stacking such sections in preparation for firing the same.

A further object of the invention is to provide a novel machine and system for providing and handling drain tile, including means for handling a continual production of predetermined lengths of the tubular wet clay, means for transmitting such lengths to a cutter and rounder mechanism, whereby such lengths are rounded into symmetrical form and are severed into shorter predetermined sections of tile, and means for taking such predetermined length sections and stacking them in up-ended relation preparatory to firing such tile.

A still further object of the invention is to provide a novel machine and system of the latter mentioned type, including means for expeditiously finishing the ends of the tile prior to stacking thereof, to thereby provide a more desirable product as compared to heretofore produced tile.

A still further object of the invention is to provide a novel automatic system for the production of drain tile, which greatly facilitates and expedites such production, resulting in more economically desirable tile, as well as tile of higher quality as compared to those heretofore produced by prior art arrangements.

Other objects and advantages of the invention will be apparent from the following description taken in conjunction with the accompanying drawings, wherein:

FIG. 1 is a generally diagrammatic, top plan view of a mechanism incorporating the instant invention and showing the basic components utilized in the mechanism, including means A for transferring elongated wet tubular clay coming from an extruder, to a rotary slicer mechanism B mounted for reciprocal movement for continual severing of predetermined lengths of wet tubular clay, means C, C' for transferring such lengths of wet clay to a rounder and cutter mechanism D for symmetrically rounding the clay and severing the lengths of clay into tile sections, means E for transferring the severed tile sections to an upender mechanism F where the tile are stacked on a platform, such as a movable kiln car K, preparatory to the firing operation on the tile, and means G for automatically moving the car with respect to the upender mechanism for continual loading of the car;

FIG. 2 is an enlarged, sectional view of the rotary slicer mechanism B of FIG. 1;

FIG. 3 is a fragmentary, sectional view taken generally along the plane of line 3—3 of FIG. 2, looking in the direction of the arrows;

FIG. 4 is a reduced size, elevational view of the rotary slicer mechanism of FIGS. 2 and 3, and showing the positional relationship thereof with the means A and C, C' for transferring wet tubular clay to and from the slicer mechanism and thence to the rounder and cutter mechanism D illustrated in FIG. 1;

FIG. 5 is a fragmentary, top plan view of the rotary slicer mechanism of FIGS. 2, 3 and 4;

FIG. 6 is a fragmentary, generally diagrammatic, elevational view taken generally along line 6—6 of FIG. 1, of an auger mechanism, for conveying waste cut ends of the predetermined lengths of wet clay from the mechanism of the invention and back to an extruder which produces the elongated lengths of wet clay;

FIG. 12 is a broken, fragmentary generally perspective view of the rounder and cutter mechanism D which rounds the received length of clay into symmetrical form and severs such length into predetermined lengths of tile;

FIG. 13 is a fragmentary top plan view of the FIG. 12 arrangement;

FIG. 14 is a fragmentary perspective view of the FIGS. 12 and 13 arrangement;

FIG. 15 is an enlarged, fragmentary view of one of the cutter knives of the cutter mechanism and the associated rotatable disc for finishing the associated end of the tile;

FIG. 16 is a diagrammatic illustration of the system for driving and controlling the rounder and cutter mechanism D of the machine;

FIG. 17 is an enlarged, generally diagrammatic illustration of one of the cams shown in FIG. 16, that controls or stops the movement of the predetermined length of wet clay just before the latter rolls by gravity into the rounder and cutter mechanism D to be cut into predetermined tile lengths;

FIG. 18 is an enlarged, generally diagrammatic elevational view of another of the cams and associated linkage thereof, which controls the actuation of the cutting knives and the finishing discs of the rounder and cutter mechanism D;

FIG. 19 is an enlarged, generally diagrammatic view of another cam of the rounder and cutter mechanism, which controls in a predetermined manner the speed of operation of the rounder rolls of the mechanism D;

FIG. 20 is an enlarged, generally diagrammatic illustration of another cam and associated linkage that controls the operation and movement of the rounder rolls of the rounder and cutter mechanism D, and illustrating certain of the rounder rolls in a "dump" position for moving the tile onto transfer mechanism E;

FIG. 21 is an elevational, fragmentary, generally diagrammatic view of certain of the rounder rolls of the rounder mechanism D and the driving arrangement therefor;

FIG. 22 is an elevational fragmentary view of certain of the rounder rolls of the rounder mechanism and the mounting arrangement therefor which enables the dumping of the tile from the rounder and cutter mechanism D to conveyor E for transmitting the severed tile to the upender mechanism F;

FIG. 23 is an enlarged elevational view, showing the rounder rolls of the mechanism during their rounding of a tile section T and the knives of the rounder and cutter mechanism D in position severing the tile into predetermined lengths;

FIG. 24 is a view generally similar to FIG. 23 but showing the knives having been moved out of severing relation with the tile after severing thereof, but with the end of the tile being finished by the associated finishing disc element;

FIG. 25 is a view generally similar to that of FIGS. 23 and 24, but showing the cutter knives and the finishing discs having been moved completely out of coacting relation with the tile, to permit dumping of the tile by the FIG. 20 arrangement onto transfer mechanism E;

FIG. 26 is an end, generally perspective view of the upender mechanism F for receiving the cut tile from mechanisms D and E and stacking them on a platform or kiln car preparatory to firing the tile;

FIG. 27 is a further, generally perspective view of such upender mechanism F showing the crank and linkage arrangement for pivoting the upender mechanism upwardly to thereby stack the tile, and then downwardly to reposed position;

FIG. 28 is a fragmentary top plan view of the upender mechanism in raised position;

FIG. 29 is a fragmentary, generally perspective view of the upender mechanism in a raised position, and showing in particular the linkage for actuating or withdrawing the stops on the upender mechanism, for permitting downward movement of the tile by gravity onto the kiln car;

FIG. 30 is a diagrammatic, elevational view of the upender mechanism in reposed position and showing the drive and controls for such upender mechanism and also some of the controls for the kiln car mover mechanism G;

FIG. 31 is a fragmentary, elevational, generally diagrammatic view of the linkage mechanism for actuating the tile stops on such upender arrangement F with the latter being in an "up" position;

FIG. 32 is a generally fragmentary, perspective view of mechanism for controlling the movement of the kiln cars with respect to the upender mechanism F to provide automatic movement of the kiln cars during loading of the car by such upender mechanism;

FIG. 33 is a perspective view of one of the rows of tile sections as provided by the rounder and cutter mechanism D;

FIG. 34 is a diagrammatic and schematic illustration of the control elements and their relationship to other elements of the machine, for providing for automatic operation thereof in the production of tile.

*General description*

Figure 7:
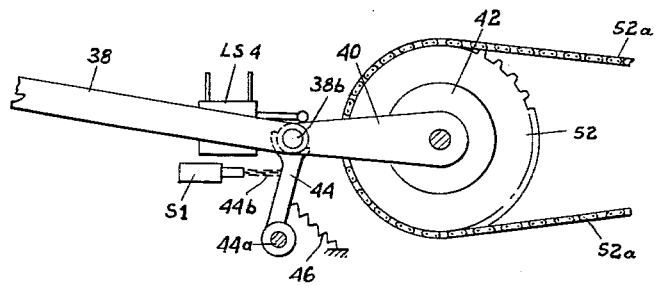
FIG. 7 is an enlarged, fragmentary, elevational view of a holding or locking mechanism which holds the rotary slicer mechanism of FIG. 2 in predetermined position prior to reciprocation thereof.

Referring now again to the drawings, which illustrate a preferred embodiment of the invention, a conventional tubular clay extruding machine 10, well known in the tile art, is adapted to furnish a continuous length of the extruded tubular clay to conveyor or transfer mechanism A. Such conveyor A is preferably of the non-driven or idler roller-type wherein the frictional resistance between the extruded wet clay and the endless belt 12 of the conveyor is such that the clay causes the belt of the conveyor to move in unison with the forward or outward movement of the clay, thereby causing movement of the belt and tubular clay toward rotary slicer mechanism D mounted in the path of the extruded clay. The elevational position of conveyor A with respect to the head of the extruder is adapted for varying so that different diameters of tubular clay may be readily accommodated.

The column of extruded clay coming from the extruder moves into coaction with the rotary slicer B which maintains its position shown in FIG. 1 for a predetermined length of time, and by means of locking mechanism. On the underside of the belt 12 there is preferably provided a measuring wheel 114 which engages the belt and is adapted for coacting with a switch in a manner to be hereinafter described, for accurately measuring a predetermined length of extruded clay from the extruder 10. This wheel 14 need not necessarily coact with the belt but could coact with the column of clay for measuring off a predetermined length of the clay. In any event, after a predetermined time, the aforementioned locking mechanism holding the rotary slicer stationary is deactivated and the slicer B moves forwardly with the column of clay plus placing the latter in transferring relation to conveyor mechanism C, C'. During the forward movement in unison of the column of clay and the rotary slicer B, the slicer is activated to sever a predetermined length of clay from the column, and then the slicer is driven back to its starting position for providing another predetermined length of tubular clay. The conveyor mechanism C, C', which are driven faster than the speed of movement of conveyor A, and for example 25% faster, moves the severed length of clay forwardly until it is disposed solely on conveyor section C' wherein the end of the clay hitting a control to be hereinafter described, causes the conveyor section C' to dump or pivot downwardly, whereupon the length of clay rolls by gravity up to the rounder and cutter D. The length of clay may be temporarily held from rolling into mechanism D by stops until mechanism D is in condition to receive such length of clay.

Upon retraction of the latter mentioned stops, the length of clay is taken into mechanism D where it is rounded into symmetrical form, then severed into three (in the embodiment illustrated) tiles, and the ends of the tiles are "finished" by rotary disc elements, to provide smooth end surfaces for such tiles. During such severing operation there are also provided front and rear waste end tile sections which are adapted to be disposed of.

The mechanism D then ejects the row of tile onto conveyor mechanism E where the row of tiles roll transversely across conveyor E until they are stopped by an abutment along the outer side of the conveyor. During such movement of the row of tile onto conveyor E, the row may activate a counter mecahnism which counts the rows being ejected from mechanism D.

The aforementioned rear end waste section of each row falls into auger 15 where such auger may return the clay of such rear end waste sections to the extruder 10 for reuse.

When the aforementioned counter has counted (in the embodiment illustrated) four rows of tile, and they are disposed in side by side relation on conveyor E, conveyor E is actuated whereupon the endless belt thereof moves the tile up to the upender mechanism F and between the finger-like portions 16 thereof, with the leading ends of the rows of tile engaging retractable stops on the upender mechanism. The conveyor E is then stopped and the upender mechanism is pivoted upwardly to a generally vertical position. The latter mentioned stops are then withdrawn from coaction with the tile, and the rows of tile fall by gravity onto a receiving platform.

In the embodiment illustrated, this is a movable kiln car K. Motor controlled chain and sprocket mechanism G is provided, in the embodiment illustrated, to move the kiln car K forwardly with respect to the upender mechanism F, after each unloading operation of the upender, and after the car is filled, it is ready for travel into the kiln for firing the tile. Meanwhile, after every unloading operation, the upender F pivots downwardly in position to receive another four rows of tile from conveyor E.

*Details*

Referring now in particular to FIGS. 2 through 5, inclusive, the rotary slicer mechanism in the embodiment illustrated comprises a base frame 17 which preferably includes leg sections 17a which are adjustable in length so that the elevational position of the rotary slicer mechanism B may be somewhat varied with respect to the extruder. In the embodiment illustrated, the legs 17a may be spring loaded, and there may be provided a cable system and coacting dog and ratchet mechanism 18, for selectively adjusting the elevational position of the rotary slicer mechanism mounted on the base frame 17 for reciprocal movement lengthwise with respect to transfer mechanism A and C. Movably mounted on base frame 17 there is a secondary frame 20 which rotatably mounts the slicer or wheel 22 thereon for rotary movement in a generally vertical plane, and about axis 22a. Secondary frame 20 is arranged for reciprocal or longitudinal movement with respect to transfer mechanisms or conveyors A and C and by means of wheels 24. Also mounted on secondary frame 20 is a trough element 26 which is detachably secured to the secondary frame 20 and which trough element is adapted to receive therein in guiding relation the length of extruded wet clay coming from the extruder 10. As best seen in FIG. 5, trough element 26 is in effect a pair of lengthwise spaced sections. More than one trough element may be mounted on the secondary frame; for instance, a plurality of trough elements could be mounted in side-by-side relation on the secondary frame 20 of the rotary slicer mechanism B, in the event that there was a pair or even more of extruder orifices, one trough element providing a guide for each length of clay coming from the respective extruder. Also, different sizes or radius of trough element may be readily provided, for handling various sizes or diameters of tile being produced by extruder 10. In this connection, the troughs 26 are preferably snap fastened by means of resilient base flanges 26a to the cross bars of frame 20. With two or more lengths of clay being extruded, the belt of idler conveyor A tends to equalize the rate of travel of the continuous lengths of clay and thus ensure equal length sections as provided by slicer mechanism B.

The aforementioned rotary wheel 22 of the rotary slicer mechanism is preferably of a generally V-shaped configuration in cross section as illustrated best in FIG. 3, and with a driving belt 28 encompassing such wheel and coacting with a drive pulley 28a of an electric motor M1 for rotating the wheel 22 of the slicer mechanism. There is also preferably provided a plurality of guide wheels 31, preferably of rubber and which coact in the V-shaped trough of the rotary wheel 22, for guiding the movement of the rotary wheel. Such guide wheels 31 are preferably slotted circumferentially thereof as at 31a, and may receive therein the more or less truncated drive belt 28, and thus maintain the belt in proper position with respect to the driven rotary wheel 22.

A slicer wire 32 extends across the diameter of rotary wheel 22, and may be detachably connected thereto by locking mechanism 34. It will be seen that upon rotation of wheel 22 due to driving thereof by motor M1, the wire will slice into the extruded clay coming from the extruder 10, and cut or sever a predetermined length of such clay. Attached to the secondary frame 20 of rotary slicing mechanism B and extending forwardly therefrom, as best shown in FIG. 4, is an arm structure 36 which may have a guide wheel 36a thereon running on a track 36b, for aiding in guiding the movement of the secondary frame during its reciprocal movement on the base frame 17.

Secondary frame 20 includes a drive rod element 38 pivotally attached thereto as at 38a, and at its other end pivotally attached as at 38b (FIGS. 7 and 8) to a crank member 40 which is adapted to be driven by a conventional spring loaded electro-responsive clutch 42 in a manner to be hereinafter described, for moving or driving the secondary frame 20 on base frame 17 back to the position illustrated in FIG. 1, after it has moved forwardly on the base frame 17 by the frictional coaction between the clay extruded from the extruder 10 and the trough 26 mounted on the secondary frame 20.

Figure 8:
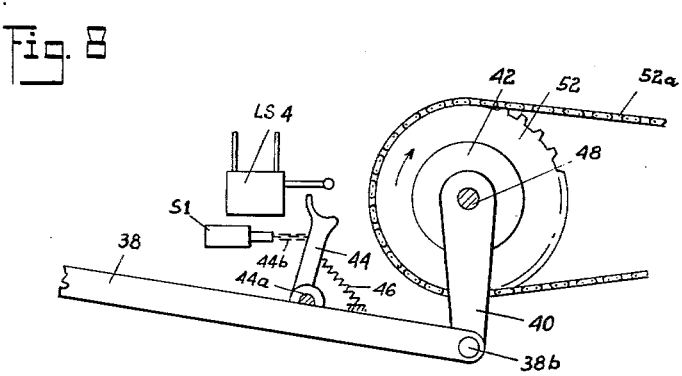
FIG. 8 is a view generally similar to FIG. 7, but showing the holding mechanism in deactivated condition whereby the rotary slicer mechanism moves forwardly from transfer mechanism A to transfer mechanism C to transfer a length of tubular clay to the conveyor mechanism C.

Referring now in particular to FIGS. 7 and 8, there is provided a locking dog 44 pivotally mounted as at 44a, and which dog is adapted to coact with a roller or abutment 45 (FIG. 4) on crank 40, for ordinarily preventing forward movement of the secondary frame 20 with respect to the base frame 17.

Figure 9:
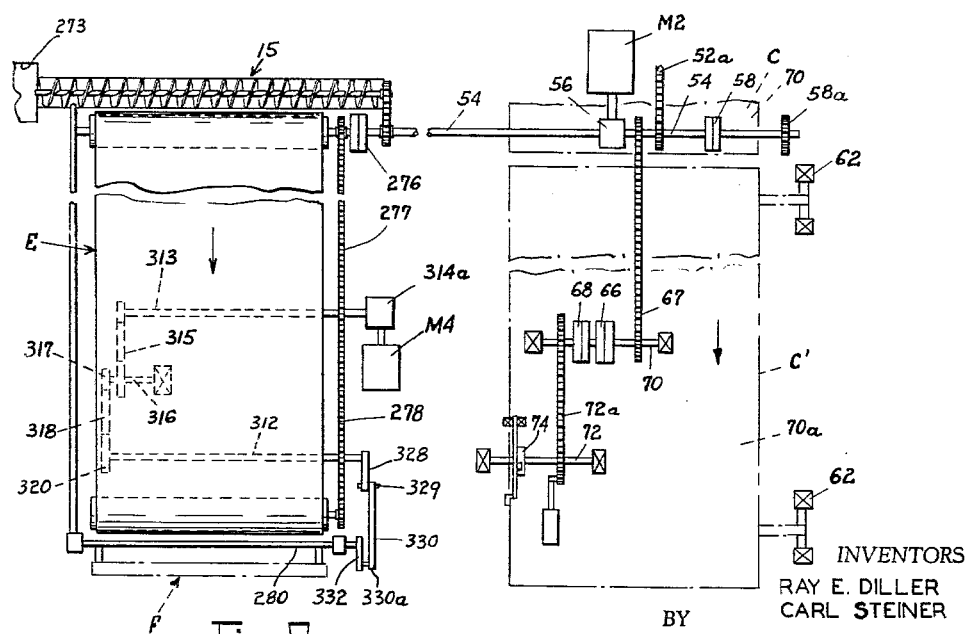
FIG. 9 is a generally diagrammatic, broken and fragmentary top plan view of the transferring mechanism C, C' and E and the power drives therefor, both for transferring the tile to the rounder and cutter mechanism D and for transferring the tile from the rounder and cutter mechanism to the upender mechanism F.
Figure 10:
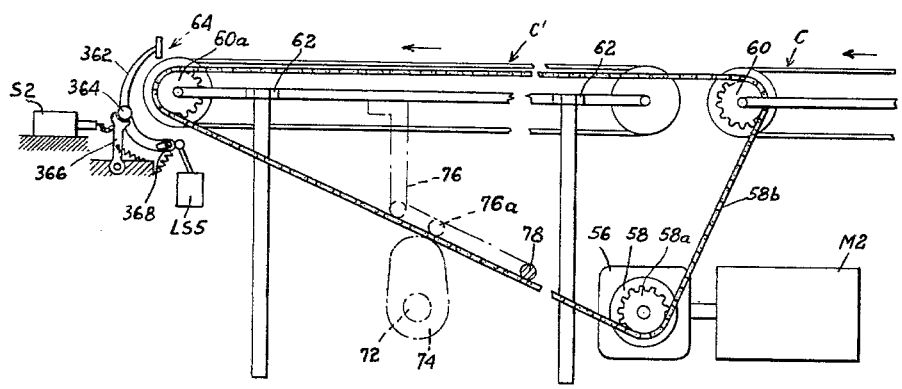
FIG. 10 is a generally diagrammatic, fragmentary elevational view of the transferring conveyor mechanism C, C' which transfers the predetermined lengths of wet tubular clay to the rounder and cutter mechanism D and illustrating in particular the dumper mechanism of conveyor C' which is adapted to transfer by gravity the predetermined lengths of clay to the rounder and cutter mechanism.
Figure 11:
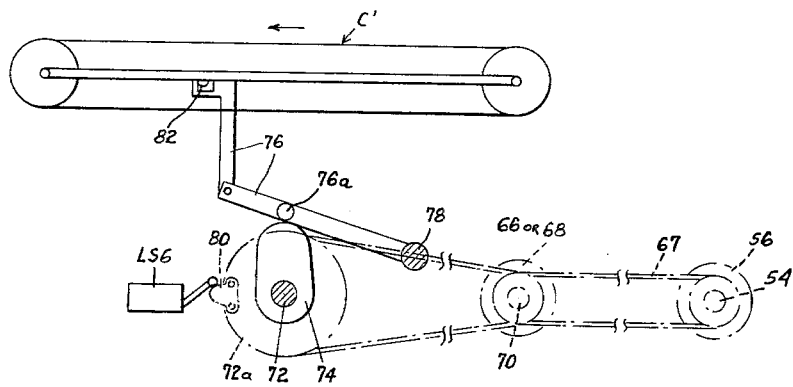
FIG. 11 is a view generally similar to that of FIG. 10, and showing the drive for the cam actuation of the dumper mechanism.

Dog 44 is coupled as by means of chain 44b to solenoid S1 and upon actuation of the solenoid, the dog 44 is pivoted rearwardly against the resistance of spring 46 and out of holding contact with the roller on crank 40, thereby permitting the tubular clay moving from the extruder 10, to move the secondary frame 20 of the rotary slicer mechanism B forwardly in unison with the movement of the clay. As can be seen in FIG. 8, such movement of the secondary frame 20 and associated rod 38 causes the crank 40 to be pivoted downwardly about the axis of its mounting shaft 48. During the forward movement of the secondary frame 20 on the base frame 17, it will be seen that the frame 20 moves in unison with the clay, and there is no relative movement therebetween. After a predetermined length of extruded clay has been measured off by the aforementioned measuring wheel 14 coacting with the conveyor belt 12, a lug on the measuring wheel actuates a conventional spring loaded switch LS1 which activates aforementioned solenoid S1, thereby unlocking secondary frame 20 and permitting its movement with the column of extruded clay. During such forward movement of frame 20, a cam 48 mounted on arm structure 36 actuates a conventional spring loaded limit switch LS2 which in turn actuates drive motor M1 thereby rotating the slicer wheel 22, whereby the cutting wire 32 slices through the length of extruded clay from extruder 10, thereby severing a predetermined length of the clay material. It will be seen that since the secondary frame 20 and the column of clay from extruder 10 are moving at the same speed, or in effect are moving as a unit, that the cut made by wire 32 is vertical to the axis of the tubular clay. Wheel 22 is adapted to rotate 180° at which time a lug 50 thereon actuates a conventional spring loaded limit switch LS3 which operates to interrupt the circuit of drive motor M1 and thus stop rotation of the wheel. Motor M1 is of the known type having conventional electro-responsive braking means associated therewith as an integral part thereof, so that the rotary slicing wheel 22 is stopped immediately upon actuation of switch LS3, thereby preventing overrun. This arrangement will be hereinafter described in greater detail in connection with the control system for the device. Actuation of limit switch LS3 to deactivate drive motor M1 also causes actuation of the aforementioned electro-responsive clutch 42, thereby causing the crank 40 to be clutched to power driven sprocket 52 which is driven by drive chain 52a from a motor M2 (FIG. 9) driving a shaft 54, via gear reducer 56, thereby rotating or pivoting the crank 40 back or in a clockwise direction (as viewed in FIG. 8) and driving, via rod 38, the secondary frame 20 back to its starting position, whereupon the roller 45 on the crank 40 is once more locked in coacting relation with locking dog 44. In the position of the parts illustrated in FIG. 7, the roller 45 actuates a normally closed limit switch LS4, which deactivates electro-responsive clutch 42, thereby stopping the drive to crank 40 from sprocket 52 and associated drive chain 52a.

Referring now to FIGS. 1, 9, 10 and 11, the transfer mechanism or endless belt conveyors C, C' are driven from a common power source, or more particularly motor M2, via conventional spring loaded electro-responsive clutch 58. Clutch 58 drives sprocket 58a which is coupled via endless drive chain 58b (FIG. 10) with drive sprockets 60, 60a on respective conveyors C, C'. As can be seen from FIG. 10, actuation of chain 58b drives conveyors C and C' in unison.

Conveyor C' is pivoted as at 62 (FIG. 1) for pivotal movement in a generally vertical plane, for dumping the predetermined length of extruded clay from conveyor C' whereby the length of clay will roll by gravity toward the rounder and cutter mechanism D.

When the extruded length of wet clay moves along conveyor C', the end of such length of such clay hits bumper 64 (FIGS. 1 and 10) which actuates spring loaded limit switch LS5, thereby deactivating clutch 58 which controls the actuation of conveyors C, C' thereby stopping the conveyor drive. Such impact of the tubular clay with the bumper 64 also actuates via switch LS5, conventional electro-responsive clutch 66 (FIGS. 9 and 11), which clutch is drivingly coupled to the motor M2 via chain and sprocket drive 67 and deactuates electro-responsive brake 68. Thus upon actuation of clutch 66 and deactuation of brake 68, jack shaft 70 drives shaft 72 via chain and sprocket drive 72a, thereby causing rotation of shaft 72 to which is fixed dumper cam 74.

Dumper cam 74 coacts with an articulated linkage 76, which includes a follower 76a coacting with cam 74, for ordinarily holding the conveyor C' in generally horizontal position, but it will be seen that upon rotation of cam 74 due to driving by clutch 66, the linkage 76 pivots about its pivot point 78 and perimts downward pivoting of conveyor C' about pivot axes 62. Cam 74 and associated drive sprocket 72a continues to rotate until lug 80 (FIG. 11) on the drive sprocket activates or opens limit switch LS6 (FIG. 11) thereby deactivating the clutch 66 driving the jack shaft 72 and permitting reactivation of the brake element 68, thus holding the conveyor C' once more in horizontal position, and ready to receive thereon another length of extruded clay. The length of clay will roll down upon dumping of conveyor C' to where it is stopped by upwardly projecting movable stops 84 (FIGS. 13 and 17) preparatory to being received in the rounder and cutter mechanism D.

Referring now primarily to FIGS. 12 through 25 inclusive, the mechanism D may comprise a framework structure 88 having a generally U-shaped secondary framework 88a pivoted thereto as at 90, and held in selected position by means of threaded shaft 92 pivotally and rotatably attached at one end as at 94 to frame 88a and threadedly coupled to nut 96 on frame 88. It will be seen by turning of wheel 96a that frame 88a may be moved or pivoted with respect to frame 88.

Rotatably mounted on frame 88 is a first roll 112 which will be hereinafter referred to as the front rounder roll. Pivoted to the front rounder roll by means of spaced arms 114 (FIGS. 13, 14, 16 and 22) is a rear rounder roll 116 of the same diameter as the front rounder roll. Roll 116 is preferably adjustably securable to arms 114 as best shown in FIG. 22, to thereby provide for rounding of various sizes or diameters of tile in the mechanism of the invention. Rotatably mounted on supplementary frame 88a is what will be called the upper rounder roll 118 which is of the same size as the other rounder rolls and which is disposed generally diametrically opposite front rounder roll 112, when referring to a tile T (FIGS. 23 to 25).

As can be best seen in FIGS. 23 to 25, upon rotation of rolls 112, 116, and 118, the tubular piece of clay disposed between such rolls is lightly engaged thereby and will be symmetrically rounded by such rotation. It will also be seen by adjusting hand wheel 96a and by adjusting the position of rear rounder roll 116, different diameters of tile may be accommodated by the mechanism.

Referring now particularly to FIG. 16, motor M3 is secured to pivot shaft 122, with such pivot shaft being rockable about its axis. A pulley 124 which is of the well known, deep grooved type, is drivingly coupled to motor M3. Pulley 124 is drivingly coupled to pulley 126, which is also of the well known deep grooved type, and as by means of belt 126a. A control lever 128 is provided which is linked, as by means of linkage 128a, to pivot shaft 122, and upon actuation of lever 128 and resultant rocking of shaft 122, the drive belt 126a can be either tensioned or slackened up on, so that the speed of rotation of drive pulley 126 can be selectively varied. Drive pulley 126 drives shaft 130, which is mounted in stationary journals 130a on frame 88. In other words, pulleys 124 and 126 and coacting drive belt 126a represent a variable pitch arrangment for selectively varying the speed of rotation of drive shaft 130.

Shaft 130 has a pulley 134 fixed thereto, which pulley may be of the aforementioned deep grooved type, and which coacts with a drive belt 134a to drive deep grooved pulley 136. Belt 134a has a tensioning pulley 138 which is adapted to coact therewith for tensioning the belt 134a and thus vary the speed of rotation of pulley 136, and the speed of rotation of the associated shaft 140 to which the pulley 136 is secured. Tensioning pulley 138 is mounted on spring loaded rockable link 142 which has follower 144 rotatably mounted thereon (FIGS. 16 and 19) which follower 144 coacts with a cam 148 for automatically tensioning belt 134a in a predetermined sequence of operation as will be hereinafter described. It will be seen that rockable shaft 142 has a spring 142a for urging the tensioning pulley 138 into tensioning engagement with belt 134a, and that during a predetermined portion $i$ (FIG. 19) of the rotation of cam 148, the tensioning pulley 138 is maintained out of tensioning engagement with the drive belt 134a by cam 148.

Also fixed to shaft 130 is a pulley 150 (FIGS. 16) which is drivingly coupled via drive belt 150a to a pulley 152, fixed to rotatable shaft 166. Shaft 166 is rockable about its pivots 166a so that the drive belt 150a can be tensioned or slackened, to thereby selectively control the speed of rotation of pulley 152. Pulleys 150, 152 may be of the aforementioned variable pitch type. Shaft 166 may be rocked by means of control lever 168 operatively coupled to shaft 166 via linkage 168a.

Another drive pulley 170 is secured to shaft 166 and is driven thereby. Pulley 170 is drivingly coupled to another pulley 172 which is secured to a jack shaft 174 rotatable in journals 174a. Sprocket 176 is secured to shaft 174 and is drivingly coupled as by means of drive chain 178, to sprocket 179 which is secured to cam shaft 180. Cam shaft 180 and associated cam elements control the movement of the rounder rolls and the cutter mechanism as will be hereinafter described in detail.

As aforementioned, pulley 136 is secured to shaft 140, and pulleys 182, 184 are likewise secured to shaft 140, which is journaled for rotation as at 186. Pulley 184 drives upper rounder roller 118 via belt 188, while pulley 182 may drive front rounder roller 112 via belt 190. Rear rounder roll 116 may be driven from roll 112 via pulleys 200, 200a, 200b and coacting drive belt 202 (FIG. 21). It will be seen that by actuation of control handle 128, the speed of rotation of the rounder rolls 112, 116, 118 may be selectively varied, and that such speed of rotation is also automatically varied by tensioning pulley 138 as will be hereinafter described. Also by actuation of control handle 168, the speed of rotation of cam shaft 180 may be varied, thus providing for coordinating the speed of the cam shaft with the speed of the rounding rollers.

Referring now in particular to FIGS. 12 through 20, the cam shaft 180 preferably adjustably mounts cams 148, 204, 206 and 208 thereon. Cam 204 coacts with a follower 210 mounted on rocker arm 212 pivoted as at 212a to frame 88 and is adapted to actuate aforementioned stops 84 which are pivoted as at 212b and which are adapted to project above openings in the plate 213, down which the extruded lengths of clay roll to the rounder and cutter mechanism. Plate 213 is movably supported for selective varying of its position. As can best be seen in FIGS. 13 and 17, during a greater portion j of rotation of the cam 204, the stops are held in raised position, and during a predetermined lesser portion k of the rotation of cam 204, the stops are caused to retract below the surface of plate 213 thus permitting the extruded length of clay to roll by gravity into the rounder rolls, and at a predetermined time in the sequence of operation of the mechanism. Holes 213a provide for varying the position of the stops 84 with respect to the plate.

Cam 206 controls actuation of the cutters and finishing discs of the mechanism D and will be described hereinafter in detail.

Cam 208 controls the upward pivoting movement of arms 114 about the axis of forward rounder roller 112, thereby causing dumping of the tile from the rounder mechanism and onto the transfer mechanism or conveyor E. Such cam 208 coacts with a follower 214 rotatably mounted on generally L-shaped link 216 which may be pivoted as at 216a to the frame 88 of the rounder mechanism D. Member 216 pivots back and forth as the follower 214 follows the cam 208 and via pivoted link 217 moves arms 114 about the axis of roll 112 in a predetermined sequence. Portion m of the cam 208 causes dumping of the rounder mechanism, or in other words upward pivotal movement of the arm 114 and associated rear rounder roller 116, and portion m' then causes lowering of rear roll 116 below the level of plate 213. Portion n of the cam provides a slight pause when roll 116 is down for "pick-up" of the length of clay, the latter having been released by retraction of stops 84. Portion p then causes upward movement of the rear rounder roller 116 from below the level of the plate 213 and during this period of time, the extruded length is "picked up" by the rear rounder roller, and the latter is moved to the general position illustrated in FIGS. 23 to 25, whereupon the front and rear rounder rollers 112, 116 are disposed substantially horizontally aligned with respect to one another. During this time, the rounder rolls are preferably driven comparatively slowly. The remainder q of the cam 208 is the cutting time of the mechanism during which time the extruded length of clay is cut by the knives 218 of the cutting mechanism into predetermined lengths of tile sections. During the cutting time of the tile by knives 218, portion r (FIG. 19) of cam 148 controlling the speed of rotation of the rounder rolls 112, 116 and 118 comes into play and automatically increases such speed by tensioning of drive belt 134a. This provides for better ends on the tile cut from the extruded length of clay. After the cutting operation, portion i of cam 148 takes over to de-tension belt 134a, thereby slowing down the speed of rounder rolls 112, 116 and 118.

Referring now again to FIG. 18, cam 206 comprises portion s during which time the cutting knives 218 are "up" for discharge of the tile and paused for the next piece of tubular clay to enter into the rounder mechanism, and portion t during which time the cutting knives are turned down as will be hereinafter described and are severing the tile during rotation thereof on rounder rollers 112, 116 and 118.

Cam 206 has a follower 230 coacting therewith with the follower being mounted on rocker arm 232 which pivots about pivot point 232a on frame 88. Pivotally connected to arm 232 is a link 234 which is pivoted as at 234a to an arm 236 which is pivoted as at 236a for rocking movement. Arm 236 is pivotally coupled as at 238 to a link 240 which in turn is pivoted as at 242 to an arm 244 pivoted for rocking movement about generally horizontal axis 246 on frame 88a. Referring now to FIGS. 23 through 25, arm 244 is pivotally coupled by means of link 248 and lever 249 to a shaft 250 which mounts the aforementioned cutter knives 218 and finishing disc 251 thereon.

Shaft 250 is rotatable or movably supported on arm elements 252, which are of generally curved or arcuate configuration overlying and partially encompassing the upper rounder roller 118 (FIGS. 12 and 13). Arms 252 are pivotally mounted on auxiliary frame 88a of the rounder mechanism and as by means of shaft 254. It will be seen therefore, that upon forward or clockwise pivotal movement of arm 244, as controlled by aforementioned cam 206 and from a position as illustrated for instance in FIG. 25 to a position as illustrated for instance in FIG. 23, arms 252 carrying discs 251 and knives 218 on rod 250, pivot clockwise and discs 251 enter the surface of the clay. Such discs as best shown in FIG. 15 have a sharpened outer periphery or circumferential flange 254' and cylindrical shoulder portions 254a on opposite sides of the flange. Discs 251 are rotatable on shaft or rod 250, and have fillets at the junctures of flange 254' with shoulders 254a, and as at 254" (FIG. 15), to cause rounding of the outer edge of the tile. Further forward pivoting of arm 244 does not affect arms 252, the latter having been stopped by any suitable abutment means, such as a stud extending from lug 256 on one of arm 252, and engaging an adjustable abutment 256a (FIG. 13) on frame 88a. However, such further forward pivotal movement of arm 244 causes rotation of shaft 250 via rod 248 and lever 249 and against the resistance of spring 259, thereby causing the knife blades 218 to pivot down and enter the rotating tile and sever the latter into three tile sections and the front and rear waste end sections, 260 and 262, respectively, as shown in FIG. 33. Blades 218 are detachably supported by structure 264 which in turn is adjustably secured, as for instance by means of set screw 264a, to rod 250. It will be seen that each knife blade 218 is disposed in alignment with finishing flange 254' on the respective disc 251.

Upon rearward or counterclockwise, as viewed in FIG. 23, pivoting of arm 244 as controlled by portion s of cam 206 (FIG. 18) the shaft 250 is first rotated with respect to supporting arms 252 and the knives are quickly withdrawn from cutting relation with the tile and to the position illustrated in FIG. 24. Further rearward pivoting of arm 244 tensions chain 266 and thus causes the supporting arms 252 and associated shaft 250 and mounted knives 218 and finishing discs 251 to be pivoted about the axis of shaft 254, upwardly out of coacting relation with the tile, thereby removing the finishing discs from any coaction with the cut tile. The rotatable discs finish the ends of the wet tile, for instance in the position illustrated in FIG. 24, and give smooth end surfaces to each of the tile, thereby providing a much more desirable tile product than if merely the knife blades 218 were utilized to cut into the clay.

When the arms 252 are pivoted upwardly to completely remove the finishing discs out of coacting relation with the tile, aforementioned cam 208 causes the arms 114 and associated rear roll 116 to be pivoted upwardly, whereby roller 116 dumps or pushes the tile from between the upper and the front rounder rollers 112, 118. As aforementioned, cam 148, during the coaction of the follower 144 with portion r of the cam, causes a speed-up of the rounder rollers substantially only during the cutting operation on the tile, and during the remainder of the rotation of the cam 148, the tensioning pulley 138 is out of coaction with the drive belt 134a and the rounder rollers operate at a speed determined by control lever 128.

As the row of cut tile and associated front and rear waste end pieces 260, 262 roll down from the rounder and cutter mechanism, due to the dumping action of the rear rounder roller 116, they roll over a spring loaded lever which actuates a conventional counter 272 (FIG. 34), thereby counting the number of rows of tile moving down onto conveyor mechanism E. An abutment 271 may be provided for stopping the tile rows. The waste rear cut end 262 of the tile row rolls into the aforementioned auger 15 which may be driven via shaft 54 from motor M2 (FIG. 9), and such rear end waste pieces are moved to an opening 273 (FIG. 1) through which they drop, for instance, onto a conveyor belt 274 to be conveyed back to the extruder 10, and reused for extruding new lengths of tubular clay.

After four columns or four rolls of tile roll over the counter actuator 270 and into side-by-side relation on conveyor E, a conventional electro-responsive clutch 276 (FIG 9) is actuated, which actuates chain and sprocket drive 277 and thus causes movement of the belt of the conveyor mechanism E in the direction of the arrow, at which time the tile rows are moved forwardly with each row being received between the fingers 16 of the upender mechanism F, and with the waste front cut end pieces 260 being disposed in abutting engagement with the stops 278 on the upender mechanism. Thereupon the conveyor E is stopped.

It will be understood, of course, that a greater or lesser number of tile could be cut for each of the rows, depending upon the number of knives provided on the rounder and cutter mechanism D, and a greater or lesser number of rows of tile could be provided for by increasing or decreasing the number of fingers between which the tile are received on the upender mechanism F assuming an adequate width of conveyor E.

These stops 278 are mounted for withdrawal movement from their abutting coaction with the forward ends of the rows of tile, so that upon raising or upward pivotal movement of the upender mechanism F, the stacked tile can drop down onto a receiving platform or kiln car K (FIG. 1). Since the front cut end pieces 260 (FIG. 33) are at the leading end of the rows of tile, during the latter's downward movement onto the kiln car, such movement does not injure in any manner whatsoever any of the tile sections.

The upender mechanism F comprises a rotatable shaft 280 rotatably mounted on frame 282 of the conveyor transfer mechanism E and to which is attached as by means of transversely spaced arm elements 284 a bar 286 to which are rigidly attached as by means of welds, fasteners, or the like, the spaced fingers 16 of the upender mechanism. As can be best seen for instance in FIGS. 28 and 29, such fingers are preferably of generally triangular shaped configuration in vertical section, to present oblique side surfaces for receiving the tile therebetween. The spacing between such fingers are proportioned to the diameter of the tile so that the tile will rest firmly between such fingers without being able to move transversely unduly.

Bar 286 and associated fingers 16 are preferably detachably connected to arms 284, and as at 288 (FIG. 28) so that different spacing between the fingers can be conveniently provided, for adapting the machine for use with different sizes of tile and for various rows of tile.

The aforementioned stops 278 are plate-like members arcuately curved as at 290 for "clearing" the tile during retraction thereof, and which plate-like members are mounted on a rod or bar 292 (FIG. 26) and with such plate-like members projecting into the spaces between the fingers of the upender mechanism. Bar 292 is preferably detachably mounted on another rod 294 and as by means of male and female connections 293 (FIGS. 26 and 31) so that the stops can be easily changed or removed. Rod 294 has projections 294a, 294b thereon (FIG. 31) generally adjacent opposite ends thereof, and pivoted to such projections at each end of bar 294 are respectively a generally L-shaped link 295 and a generally linear link 296. Each of links 295 is pivoted as at 295a to the respective arm 284 of the upender, while link 296 is likewise pivoted as at 296a to the respective arm 284 in rearwardly or inwardly spaced relation to link 295. A rod 297 preferably extends between links 295 and is secured thereto. Thus it will be seen that rod 294 which supports the stop members 278 is pivotable on arms 284 of the upender mechanism for generally linearly rearward withdrawl movement with respect to the fingers 16 of the upender mechanism. A projection 298 extends generally diagonally downwardly and rearwardly from rod 297 and is secured thereto. Pivoted to projection 298 as at 298a is a first link 299 which in turn is pivoted as at 299a to a second link 299b which in turn is fixed to an elongated control rod 300 (FIG. 28) extending through arm 284 and rotatably supported thereon.

A lug 302 (FIG. 29) projecting outwardly from shaft 280 engages the articulated links 299, 299b, and prevents downward collapsing of such links about their pivotal connection 299a, thus maintaining the stop members 278 in their interfering or stopping relation in the spaces between the fingers 16 of the upender mechanism. Spring means 304 may extend between rod 294 and shaft 280 to tend to withdraw the stop plates from their abutting presenting position. It will be seen, therefore, that upon rotation of rod 300 in a clockwise direction as viewed in FIGS. 31, the links 299, 299b are caused to collapse upwardly, thereby permitting the spring means 304 to cause pivotal movement of the rod 294 about its pivotal supports 295a, 296a and causing withdrawal of the stops 278 from their abutting presenting position on the upender mechanism. This action occurs when the upender mechanism fingers 16 are in a subtsantially vertical position thereby permitting the rows of tile supported by stops 278 between fingers 16 to drop downwardly onto the platfrom or kiln car K (FIG. 29).

As can be best seen in FIGS. 28, 29 and 30, control rod 300 is caused to rotate in a clockwise direction to cause withdrawal of the stops 278. Such rod 300 includes an elongated right angled portion 306 which is adapted for engagement with a generally S-shaped actuator 307 extending outwardly to one side of frame 282 (as best shown in FIG. 28) and which is adapted for rocking movement to rotate finger 306 and rod 300, to collapse links 299, 299b, upon engagement of outer end portion 309 of actuator 307 (FIG. 30) by roller finger 310 adjustably secured to shaft 312.

Actuation of our upward pivotal movement of mechanism F is obtained from a motor M4 (FIGS. 9 and 27) mounted on the side of the conveyor mechanism E. The motor M4 is of the conventional well known type having electro-responsive braking means integrally associated therewith, so that upon deactivation of the motor, the braking means is immediately applied to prevent overrunning of the motor drive. Motor M4 operates through a gear reducing unit 314a of conventional type to rotate the shaft 313 which via sprocket and chain drive 315 operates jack shaft 316 to which is fixed a further sprocket 317, which via chain drive 318, rotates sprocket 320 in a clockwise direction (as viewed in FIG. 30) with sprocket 320 being fixed to aforementioned shaft 312 having the aforementioned finger 310 secured thereto.

It will be seen upon rotation of sprocket 320, the shaft 312 and associated finger rotates and engages the aforementioned actuator 307 which rocks upwardly and causes collapse of links 299, 299b thereby retracting the stops.

Shaft 312 extends transversely across the conveyor mechanism E and adjacent an end thereof, is an arm 328 (FIG. 27) pivoted as at 329 to a link 330 which in turn is pivoted as at 330a to a crank 332 fixed to rotatable shaft 280 which operates or rotates the upender mechanism. It will be seen, therefore, that upon rotation of arm 328 by shaft 312, the upender mechanism is caused to pivot upwardly approximately 90° from its reposed position and to a discharge position for the rows of tile disposed between the fingers of the upender mechanism at which time the stops 278 are withdrawn to drop the rows of tile, and that linkage 328, 330 and 332 changes the 360° rotary movement of shaft 312 to first an approximately 90° rotative movement of shaft 280 in one direction and then another 90° rotative movement of shaft 280 back in the other direction, to thereby first raise the upender mechanism and then lower the upender mechanism back to reposed position on conveyor E. Also, such linkage provides a relatively slow linear speed to the upender during its final movement to discharge position, to assure that the rows of tile will not be thrown forwardly, while still providing faster movement before and after such final movement to discharge.

Now in order to automatically recock the stop withdrawal linkage 299, 299b so that the stops will be disposed once more in their tile abutting relationship between the fingers of the upender mechanism when the upender mechanism is moved back to a reposed position in readiness to receive more rows of tile therein, right angled portion 306 of stop control rod 300 is connected as by means of a link chain 334 (FIG. 27) to a bolt or shank 335 slidable extending through a housing 336 on the frame of the conveyor mechanism E, and with such bolt or shaft being spring loaded as at 336a (FIG. 28) by a compression spring, so that as the upender mechanism moves down to a reposed position and the rod 300 is being moved rearwardly with respect to conveyor E with the arms 284 of the upender mechanism, the rod is rotated slightly in a counterclockwise direction, as viewed in FIG. 29 by a pull on chain 334 and thereby causes the links 299, 299b to pivot about their common pivot point 299a into a generally linear relation and into engagement with the stop lug 302 (FIG. 31) to thereby once again "cock" the stops 278 against the resistance the elongation or tension of spring means 304 and for abutting engagement with the new rows of tile rolling off the rounder and cutter mechanism D onto conveyor E.

The kiln car or platform K is adapted to move on rails underneath the conveyor mechanism E and upender mechanism F to receive the tile from the latter, and there is provided a power operated endless chain mechanism 340, which is adapted to automatically move the car in relation to the loading thereof. The chain mechanism is sprocket mounted as at 341 at its ends (FIGS. 1 and 32) and may have lugs or couplings 342 which in the embodiment illustrated are merely spaced apart cylindrical elements on which are adapted to rest an axle of the kiln car and thus move the car along the rails with movement of the chain.

Referring now to FIG. 32, a motor M5 having a pulley 344 is drivingly coupled to another pulley 346 by means of a drive belt 346a. The pulley 346 is secured to a shaft operating through a conventional gear reducing unit 348 which gear reducing unit drives one of the end sprockets 341 of the chain drive 340. Sprocket 341 drives a pinion gear 350 which in turn drives a toothed gear element 352 rotatably mounted on structure 354 between rails 356. The gear element 352 has a plate 352a detachably secured thereto and having a plurality of circumferentially spaced pins 358 thereon, spaced apart a predetermined distance so that during driving of the motor M5 and rotation of the sprocket 341, the gear element 352 is rotated until one of the pins 358 on plate 352a contacts the feeler 360 on a conventional spring loaded limit switch LS9 which therefore actuates the switch and deactivates the motor M5 driving the car moving chain. The motor M5 is of the well known type having electro-responsive braking means integrally associated therewith, so that upon deactivation of the motor, the associated braking means is immediately an automatically actuated, thereby preventing over-running of the motor drive and in the well known manner. Motor M5 is actuated to move the car K as follows: The aforementioned sprocket 320 (FIG. 30) has an arcuate cam 362 disposed on the inner surface thereof, so that as the sprocket rotates, the cam engages a limit or car mover start switch LS8 which actuates the motor M5 driving the car moving chain 340. When the cam 362 moves by the car moving switch LS8 the switch is deactivated. This arrangement will be hereinafter discussed in greater detail. It will be seen, however, that by changing plate 352a so as to have a different spacing of pins 358, different movement of the car K with respect to the upender F can be readily obtained.

*Operation*

Referring now to FIG. 34, there is diagrammatically illustrated the various elements of a control system which may be utilized to control the aforementioned mechanisms of the machine of the invention and therefore provide for automatic operation of the machine. Spring loaded limit switch LS1 temporarily actuates the solenoid S1 (FIG. 7) after a predetermined rotation of the measuring wheel 14 coacting with the belt of conveyor A thereby deactivating the locking dog mechanism 44 and permitting the supplementary frame 20 of the rotary slicer mechanism to move on the main frame 17 thereof. Upon such movement of the supplementary frame, spring loaded limit swtich LS2 is actuated by the cam 48 (FIG. 4) on the slicer frame, thereby actuating a relay R1 whose contacts R1' and R1" then close to activate the motor M1 of the rotary slicing mechanism, causing a predetermined length of extruded clay to be severed off. After approximately 180° of movement of wheel 22, cam 50 on the rotary slicing mechanism actuates the double pole limit switch LS3, opening one contact thereof to deactivate relay R1 to thereby deactivate drive motor M1 (whereupon the integral braking mechanism on the motor prevents overrunning thereof) and closing the other contact thereof to actuate relay R2. Normally open contact R2' of relay R2 therefore closes to cause the electro-responsive clutch mechanism 42 to clutch the crank 40 to driven sprocket 52 and therefore causing movement of the auxiliary frame 20 back to its initial position, whereupon it is once more locked in position by the locking dog 44. In such locked position, normally closed, limit switch LS4 is opened by the roller on crank 40, therefore deactivating the electro-responsive clutch 42 via relay R2 and stopping the rearward drive of the auxiliary frame 20 on the main frame 17.

The control button PB1 has been previously manually actuated to start actuation of the motors M2 and M3 (FIGS. 9 and 16) through conventional starting mechanism, and therefore the conveyors C, C' are powered via electro-responsive clutch 58, with the endless belts thereof carrying the cut length of clay therealong.

When the cut length of clay engages the bumper mechanism 64 (FIG. 10) at the end of the conveyor mechanism C', double pole, spring loaded limit switch LS5 is actuated by the limited movement of arm 362 of such bumper, which arm 362 is adapted to pivot about horizontal axis 364 so long as locking dog 366 maintains bumper 64 in the operative position shown. If for some reason the extruded length of clay cut to predetermined length by the rotary slicer mechanism B is defective, there may be provided a push button PB2 (FIG. 34) which is operable to actuate the solenoid S2 thereby retracting the locking dog 366 holding arm 362 in predetermined position, and the arm pivots downwardly about bottom pivot 368 (FIG. 10) without actuating LS5, thereby permitting the defective length of extruded clay to run off the end of the conveyor mechanism C'. When the defective length of clay has been disposed of, PB2 is released to deactivate S2 and bumper arm 362 may be manually shoved back, or may be urged back by springs, into elevated position whereupon the arm is automatically locked by dog 366, and therefore the bumper is in condition once more to actuate LS5. It will be seen that when the arm 362 has been pivoted downwardly to an inactive position, LS5 is not actuated, and therefore the clutch 58 for the conveyor mechanisms C, C' continues to drive the conveyors.

When the bumper 64 pivots about axis 364 a limited amount upon impact by a length of tubular clay, thereby opening one contact of LS5 and closing the other contact thereof, a relay R3 deactivates the clutch 58 driving the conveyors C, C' via normally closed contact R3' and deactivates the spring loaded electro-responsive braking mechanism 68 which normally holds the conveyor dumping mechanism 76, 76a in selected position, and activates the electro-responsive clutch mechanism 66 via normally open relay contact R3" which causes rotation of the dumper cam 74 to cause dumping of the conveyor section C', thereby causing the length of clay to roll down against the aforementioned stops 84 preparatory to entering the rounder and cutter mechanism D. After the cam 74 on the dumping mechanism rotates 360° back to its lifting position with respect to the conveyor C', limit switch LS6 is actuated by the lug 80 (FIG. 11) on the driving sprocket 72a of the dumping mechanism, thereby deactuating relay R3 and the clutch 66 driving the dumping mechanism, and reactuating the clutch 58 causing driving of the conveyors C, C' and permitting re-actuation of the spring loaded brake mechanism 68, thereby holding the dumping mechanism and the associated dumping cam 74 in position, wherefore the conveyor mechanism C' is maintained in a generally horizontal condition.

Referring now to FIG. 17, in conjunction with FIG. 34, stop mechanism 84 is retracted by rotation of the cam shaft 180; the stops are retracted below the surface 213 supporting the extruded length of clay, and at the same time the rear rounder roller 116 dips down below the surface 213, whereupon the length of clay will roll by gravity into the rounder rolls. The cam 208 thereupon raises once more the rear rounder roll 116 causing the tile to be disposed between the rounder rolls, and rotation of the rolls causes the tile to be symmetrically rounded. When the cam 206 actuates the cutter linkage mechanism (e.g., 232, 234, 244) the cutter knives 218 are inserted into the clay and the length of extruded clay is cut into, in the embodiment illustrated, providing three tiles with the waste end sections 260, 262. Upon rotation of the cam 208 to the position illustrated in FIG. 20, the rear rounder roll and supporting arms 114 therefor are pivoted upwardly, thereby dumping the row of tile from the rounder and cutter mechanism D and onto the conveyor mechanism E. As the rows of tile ejected from mechanism D actuate the conventional counter 272, it counts off four rows of tile whereupon it actuates a conventional timer T1 which in turn actuates the timer T2 when timer T1 contact T1' closes. Timer T1 delays actuation of the timer T2 and thus the clutch 276 which drives the conveyor mechanism E, until such time as the four rows of tile are disposed on the belt of the conveyor, and in aligned relation with the spaces between the fingers 16 of the upender mechanism. Thereupon the clutch 276 driving the conveyor E moves the rows of tile intermediate the fingers of the upender mechanism. When timer T2 times out, normally closed timer contacts T2' open to automatically deactivate the clutch 276 driving the conveyor E thereby stopping the conveyor drive, and normally open timer contacts T2" closes to automatically actuate the motor M4 driving the upender mechanism F.

The motor M4 rotates the shaft 280 as heretofore described whereupon the upender mechanism is first raised 90° and then the arm or finger 310 actuates the rod 300 as aforediscussed, causing withdrawal of the stops 278 on the upender mechanism, and the rows of tile with the front waste ends 262 are stacked upon the car K. Continued rotation of the shaft 280 causes the upender mechanism to move downwardly whereupon the stops 278 are reactivated into the spaces between the fingers of the upender mechanism.

The cam 366 (FIG. 30) on the driving sprocket 320 for the upender mechanism thereupon actuates a limit switch LS7, which causes opening of timer contacts T2" and thus deactivates the motor M4. Meanwhile, the cam on the driving sprocket 320 of the upender mechanism has actuated limit switch LS8 as aforedescribed which caused actuation of the motor M5 driving the car mover chain 340 and until such time as limit switch LS9 was actuated or opened by one of the pins 358 on the rotary gear mechanism 352 for the car mover. The chain 340 was therefore stopped in its movement since relay R4 was deactuated opening contact R4', and the car was in position for receiving the rows of tile from the upender mechanism. The aforedescribed process may continue automatically until such time as the car is completely filled with the side-by-side, stacked rows of tile to the desired degree, and then a new car is moved into position for receiving the tile from the upender mechanism. The loaded kiln car may then be taken with its load of tile and placed in a heating or firing device for firing the tile and in the conventional manner.

From the foregoing discussion and accompanying drawings it will be seen that the present invention provides a novel method and mechanism for producing such items as tile, for instance drain tile, and for handling and preparing such tile for entry into a drying or firing device, and wherein such mechanism provides predetermined lengths of tubular plastic material, such as wet clay, severs such lengths into shorter predetermined length sections, and then stacks such sections onto a kiln car in preparation for firing the tile.

The terms and expressions which have been used are used as terms of description, and not of limitation, and there is no intention in the use of such terms and expressions of excluding any equivalents of any of the features shown, or described, or portions thereof, and it is recognized that various modifications are possible within the scope of the invention claimed.

We claim:
1. A machine for producing drain tile from semi-plastic clay material in generally cylindrical form comprising,
(a) means including a rotary slicer mechanism movable generally linearly with an endless length of such material, for providing a predetermined length of such semi-plastic clay material, said means including,
  (1) trough means on said slicer mechanism adapted for frictional coaction with said endless moving length of cylindrical material to move said rotary slicing mechanism therewith from a starting position,
  (2) means for locking said rotary slicing mechanism in its starting position,
  (3) means for deactuating said locking means to permit movement of said rotary slicing mechanism with said endless length of material, and
  (4) means for moving said rotary slicing mechanism in the opposite linear direction back to its starting position, after actuation of said slicer mechanism to provide said predetermined length of material,
(b) a rounder mechanism stationarily mounted as a unit and including power driven vertically spaced parallel extending rollers for receiving said predetermined length of clay therebetween in generally horizontal condition, and rounding it into symmetrical form by rolling it about its lengthwise axis while maintaining said axis generally stationary against sidewise movement,
(c) transfer means coacting between said slicer mechanism and said rounder mechanism for conveying said predetermined length of clay from said slicer mechanism to said rounder mechanism, said transfer means including,
(1) means for first moving said predetermined length in a direction lengthwise of said axis, and then in a direction transverse of said axis into said rollers of said rounder mechanism,
(d) a plurality of cutting means on said rounder mechanism,
(e) means for actuating said cutting means to cause severing of said predetermined length of clay during rotation thereof by said rollers into a plurality of laterally and horizontally disposed tile,
(f) means on said cutting means for smoothing the ends of said tile after said severing operation,
(g) movable means on said rounder mechanism to eject the severed tile sidewise from said rounder mechanism upon termination of said cutting and end smoothing operations,
(h) upender means disposed to receive the tile from said rounder mechanism upon ejection thereof and for moving said tile to upended superimposed condition onto a movable receiving platform, said upender means including,
(1) a vertically swingable tile supporting member stationarily pivoted for movement in a generally vertical plane and from a generally horizontal position to a substantially vertical position and vice versa, said tile suppotring member being adapted to receive said tile thereon in the horizontal position thereof and to move the tile upwardly into a vertical position, said tile supporting member having,
(2) withdrawable stop means movably mounted on said supporting member adjacent the pivoted end thereof and adapted in the active position of said stop means to engage the leading end of a row of the tile and to permit the tile to drop by gravity onto said platform when the tile supporting member is swung to its vertical position and said stop means are withdrawn to an inactive position,
(3) latch means including a pair of articulated links coacting between said stop means and said supporting member and adapted to be oriented substantially linearly with respect to one another for holding the stop means in said active position, and
(4) means for deactivating said stop means to move the latter to said inactive position, said deactivating means comprising a linkage mounted on said supporting member and connected to one of said links for causing collapsing of said links from said linear condition to an angular condition upon predetermined actuation of said linkage, and spring means coacting with said stop means for causing rapid withdrawal thereof from said active position upon said collapsing of said articulated links, and
(5) means including an anchored flexible element coacting with said linkage for automatically reactivating said stop means by actuating said linkage to cause movement of said articulated links back to said linear position against the resistance of said spring means upon movement of said supporting member from said vertical position to said horizontal position.

2. An upender mechanism for use in the production of drain tile and the like for receiving at least one roll of generally horizontally disposed, axially aligned tile, and stacking such tile in vertical superimposed condition on a receiving platform, said mechanism comprising,
(a) a tile supporting frame stationarily pivoted for swinging movement in a generally vertical plane and from a generally horizontal position to a substantially vertical position and vice versa,
(b) withdrawable stop means movably mounted on said frame and in the active position of said stop means being adapted for abutting engagement with the leading end of the row of tile,
(c) latch means including a pair of articulated links coacting between said stop means and said frame and adapted to be oriented substantially linearly with respect to one another for holding the stop means in said active position,
(d) means for deactivating said stop means to move the latter to an inactive position by withdrawing the stop means from coaction with the row of tile in the vertical position of said framework, to permit the row of tile to drop by gravity onto the receiving platform,
(1) said deactivating means including a linkage mounted on said frame and connected to one of said links for causing collapsing of the articulated links from said linear condition to an angular condition upon predetermined actuation of said linkage, and spring means coacting with said stop means for rapidly withdrawing said stop means from said active position upon said collapsing of said articulated links, and
(e) means including an anchored flexible element coacting with said linkage for automatically reactivating said stop means by actuating said linkage to cause movement of said articulated links back to said linear position against the resistance of said spring means upon movement of said frame from said vertical position to said horizontal position.

3. An upender mechanism in accordance with claim 2 including a lug on said frame projecting into coaction with said links in the linear condition thereof, to prevent collapsing of said links in one direction while permitting collapsing thereof in the opposite direction by said linkage.

4. An upender mechanism in accordance with claim 2 wherein said anchored flexible element includes spring means coacting therewith for extension of said flexible element during movement of said frame to said horizontal position.

5. An upender mechanism in accordance with claim 2 wherein said frame comprises a plurality of parallel extending transversely spaced fingers with the latter being adapted to receive the row of tile therebetween in supported relation, and conveyor means for moving the row of tile horizontally intermediate said fingers and into engagement with said stop means.

6. An upender mechanism in accordance with claim 2 wherein said stop means are arcuately recessed where they engage the leading end of the row of tile, for facilitating movement of said stop means to said inactive position.

7. An upender mechanism in accordance with claim 2 including means for automatically actuating said linkage in the vertical position of said frame to cause said collapsing of said links from said linear condition and movement of said stop means to said inactive position.

8. An upender mechanism in accordance with claim 7 wherein the last mentioned linkage actuating means comprises a rotatable finger movable with said frame, and a rockable actuator coacting with said linkage and engageable with said rotatable finger to cause actuation of said linkage and collapsing of said links.

9. A machine for producing round, elongated objects from a moldable, semi-plastic material such as clay in generally cylindrical form comprising,
(a) means including a rotary slicing mechanism movable generally linearly with an endless moving length of the generally cylindrical material, for providing a predetermined length of such material, said means including,
(1) means on said rotary slicing mechanism adapted for coaction with the endless moving length of cylindrical material to move said rotary slicing mechanism therewith from a starting position, and (2) means for moving said rotary slicing mechanism in the opposite direction back to its starting position after actuation of said slicer mechanism to provide said predetermined length of material, (b) rounder means stationarily mounted as a unit and including power driven generally horizontally extending vertically spaced rotatable rollers for receiving said predetermined length therebetween in generally horizontal condition and rounding said predetermined length into symmetrical form by rolling said predetermined length about its lengthwise axis while maintaining said predetermined length generally stationary against sidewise movement, (c) transfer means coacting between the first mentioned means and said rounder means for transferring said predetermined length from said first mentioned means to said rounder means, said transfer means including means for first moving said predetermined length in a direction lengthwise of said axis and then in a direction transverse of said axis into said rollers of said rounder means, (d) cutting means coacting with said rounder means for cutting said predetermined length into a plurality of shorter length sections during said rotation thereof by said rollers, (e) said rounder means including movable means for ejecting said shorter length sections sidewise therefrom after said cutting operation, (f) upender means including a vertically swingable supporting member pivoted for movement from a generally horizontal position to a substantially vertical position and vice versa for receiving said shorter length sections in generally horizontal condition from said rounder means and stacking the same in upended superimposed condition on a receiving platform, said upender means comprising, (1) withdrawable stop means movably mounted on said supporting member for abutting coaction with the leading end of a row of said shorter length sections in the active position of said stop means, said stop means being adapted for withdrawal from coaction with the row of shorter length sections when said supporting member is in said vertical position to permit the row of shorter length sections to drop by gravity onto the receiving platform, (2) latch means coacting between said stop means and said supporting member to hold said stop means in said active position, and (3) means for deactivating said stop means including resilient means coacting with said stop means to cause rapid movement of said stop means to an inactive position upon deactuation of said latch means.

10. A machine for producing drain tile from semiplastic clay material in generally cylindrical form comprising, (a) means including a rotary slicing mechanism movable generally linearly with an endless moving length of the generally cylindrical material for providing a predetermined length of such material, said means including, (1) means on said rotary slicing mechanism adapted for frictional coaction with said endless moving length of cylindrical material to move said rotary slicing mechanism therewith from a starting position, (2) means for locking said rotary slicing mechanism in its said starting position, (3) means for deactivating said locking means to permit movement of said rotary slicing mechanism from its said starting position, and (4) means for moving said rotary slicing mechanism in the opposite linear direction back to its starting position, (b) rounder means stationarily mounted as a unit and including power driven, generally horizontally extending, vertically spaced rotatable rollers for receiving said predetermined length therebetween in generally horizontal condition and rounding said predetermined length into symmetrical form by rolling said predetermined length about its lengthwise axis while maintaining said predetermined length generally stationary against sidewise movement, (c) transfer means cocating between the first mentioned means and said rounder means for transferring said predetermined length from said first mentioned means to said rounder means, said transfer means including means for first moving said predetermined length in a direction lengthwise of said axis and then in a direction transverse of said axis into said rollers of said rounder means, (d) cutting means coacting with said rounder means for cutting said predetermined length into a plurality of shorter length tile sections during said rotation thereof by said rollers, (e) said rounder means including movable means for ejecting said shorter length tile sections sidewise therefrom after said cutting operation, (f) upender means including a vertically swingable supporting member pivoted for movement from a generally horizontal position to a substantially vertical position and vice versa for receiving said shorter length tile sections in generally horizontal condition from said rounder means and stacking the same in upended superimposed condition on a receiving platform, said upender means comprising, (1) withdrawable stop means movably mounted on said supporting member for abutting coaction with the leading end of a row of said shorter length tile sections in the active position of said stop means, said stop means being adapted for withdrawal from coaction with the row of shorter length tile sections when said supporting member is in said vertical position to permit the row of shorter length tile sections to drop by gravity onto the receiving platform, (2) latch means coacting between said stop means and said supporting member to hold said stop means in said active position, and, (3) means for deactivating said stop means including resilient means coacting with said stop means to cause rapid movement of said stop means to an inactive position upon deactuation of said latch means.

11. An upender mechanism for use in the production of drain tile and the like for receiving at least one row of generally horizontally disposed, axially aligned tile and stacking such tile in vertical superimposed condition on a receiving platform, said mechanism comprising, (a) a tile supporting frame pivoted for swinging movement in a generally vertical plane and from a generally horizontal position to a substantially vertical position and vice versa, (b) withdrawable stop means movably mounted on said frame for abutting coaction with the leading end of a row of tile, (c) latch means including a pair of articulated links coacting between said stop means and said frame and adapted to be oriented substantially linearly with respect to one another for holding the stop means in said active position, and (d) means for deactivating said stop means to move the latter to an inactive position by withdrawing the stop means from coaction with the row of tile in the vertical position of said frame to permit the row of tile to drop by gravity onto the receiving platform, (1) said deactivating means including a linkage mounted on said frame and connected to one of said links for causing collapsing of said articulated links from said linear condition to an angular condition upon predetermined actuation of said linkage, and spring means coacting with said stop means for rapidly withdrawing said stop means from said active position upon said collapsing of said articulated links.

References Cited by the Examiner

UNITED STATES PATENTS

| | | | |
|---|---|---|---|
| 761,404 | 5/1904 | Robinson | 25—40 |
| 764,724 | 7/1904 | Henry | 25—40 |
| 1,156,574 | 10/1915 | Adderson | 25—156 |
| 1,240,575 | 9/1917 | Jeffery | 25—156 |
| 1,514,207 | 11/1924 | Gory | 214—1 |
| 1,870,207 | 8/1932 | Washburne | 214—6 |
| 2,144,852 | 1/1939 | Rigdon | 25—109 |
| 2,261,114 | 11/1941 | Hawk | 25—109 |
| 2,291,899 | 8/1942 | Jones | 25—105 |
| 2,591,267 | 4/1952 | Lacey et al. | 25—30 |
| 2,713,189 | 7/1955 | Webb | 25—105 |
| 3,003,216 | 10/1961 | Schmunk et al. | 25—107 |
| 3,035,469 | 5/1962 | Schmunk et al. | 25—107 |

J. SPENCER OVERHOLSER, *Primary Examiner.*

ALEXANDER H. BRODMERKEL, ROBERT F. WHITE, *Examiners.*